(12) United States Patent
Tsukamoto

(10) Patent No.: US 6,834,986 B2
(45) Date of Patent: Dec. 28, 2004

(54) HEAD LAMP FOR BICYCLE

(75) Inventor: Satoshi Tsukamoto, Sakai (JP)

(73) Assignee: Cateye Co., Ltd., Osaka (JP)

( * ) Notice: Subject to any disclaimer, the term of this patent is extended or adjusted under 35 U.S.C. 154(b) by 0 days.

(21) Appl. No.: 10/397,500

(22) Filed: Mar. 26, 2003

(65) Prior Publication Data

US 2003/0189835 A1 Oct. 9, 2003

(30) Foreign Application Priority Data

Apr. 8, 2002 (JP) ........................................ 2002-104887

(51) Int. Cl.$^7$ ................................................ B62J 6/02
(52) U.S. Cl. ........................ 362/475; 362/240; 362/244; 362/545
(58) Field of Search ................................ 362/473–476, 362/543–545, 548, 240, 244, 245

(56) References Cited

U.S. PATENT DOCUMENTS

| 5,101,326 | A | * | 3/1992 | Roney | 362/545 |
| 5,457,612 | A | | 10/1995 | Carter | 362/473 |
| 5,921,669 | A | * | 7/1999 | Taylor et al. | 362/476 |
| 6,017,140 | A | * | 1/2000 | Chou | 362/475 |
| 6,152,590 | A | * | 11/2000 | Furst et al. | 362/545 |
| 6,520,666 | B1 | * | 2/2003 | Beyerlein et al. | 362/244 |
| 6,520,669 | B1 | * | 2/2003 | Chen et al. | 362/545 |
| 6,572,249 | B2 | * | 6/2003 | Bailey | 362/473 |
| 2002/0008976 | A1 | | 1/2002 | Gronemeier et al. | 362/545 |

FOREIGN PATENT DOCUMENTS

| DE | 20115786 | 3/2002 |
| DE | 20115826 | 3/2002 |
| JP | 2002-104887 | 3/2004 |

OTHER PUBLICATIONS

Patent Abstract of Japan, Publication No. 10–228803, Date of Publication of Application Aug. 25, 1998; Title: Head Light Device for Vehicle; Application No. 08–353258; Date of Filing: Dec. 16, 1996, Applicant: Shizuoka Keisozai KK; Inventor: Nanba Hisashi.

Patent Abstract of Japan; Publication No. 02–177205; Date of Publication of Application; Jul. 10, 1990; Title: Front Lighting Device for Vehicle; Application No.: 63–329037; Date of Filing: Dec. 28, 1988, Applicant: Yamaha Motor Co. Ltd.; Inventor Mizuno Takayoshi.

Patent Abstract of Japan; Publication No. 2002-225762; Date of Publication of Application; Aug. 14, 2002; Title: Bicycle Light Using Bulk Lens; Application No.: 2001–022460; Date of Filing: Jan. 30, 2001; Applicant: Rabo Sufia KK; Inventor Tamaoki Satoshi.

* cited by examiner

Primary Examiner—Alan Cariaso
(74) Attorney, Agent, or Firm—Olson & Hierl, Ltd.

(57) ABSTRACT

There is provided a bicycle head lamp employing an LED having high energy efficiency to be capable of provide sufficiently increased illuminance at a center position a predetermined distance ahead and also satisfying a predetermined distribution of light. A head lamp attached to a bicycle includes a casing, a plurality of adjacently arranged LEDs, and a lens arranged closer to an opening for each LED.

3 Claims, 9 Drawing Sheets

HEAD LAMP FOR BICYCLE

BACKGROUND OF THE INVENTION

1. Field of the Invention

The present invention relates generally to head lamps for bicycles and particularly to head lamps for bicycles using a light emitting diode as a light source.

2. Description of the Background Art

Conventionally bicycle head lamps have been provided with a light source often in the form of an incandescent lamp for example having a tungsten filament sealed therein. Its power source is provided by a battery and a current supplied from the battery enables the incandescent lamp to generate heat and emit light. Such an incandescent lamp, readily attachable to a bicycle, has generally been used.

However, an incandescent lamp generates heat and a large portion thereof is not used as a light source but lost as heat energy and the battery's lifetime becomes short disadvantageously. A sufficiently long battery lifetime can be ensured simply by using a battery having a large capacity. This, however, provides an increased weight. Accordingly, increasing the battery's capacity is limited to a range. Furthermore, an incandescent lamp itself has a short lifetime.

As a light source providing for the above disadvantages of an incandescent lamp a light emitting diode (LED) is used. An LED does not generate so much heat as it emits light through recombination of carrier at a junction of semiconductor. As such, enhanced energy efficiency can be provided and a significantly increased battery lifetime can accordingly be provided. Furthermore, an LED has a longer lifetime than an incandescent lamp and is used not only for bicycle head lamps but a variety of light sources.

A bicycle head lamp is required to satisfy a variety of performances. Most important is illuminance in a vicinity of a front side for example 10 m ahead. Such an important performance is explicitly provided in a variety of standards. For example the International Organization for Standardization (ISO) 6742-1 provides, for a bicycle shown in FIG. 7, a distribution of light a predetermined distance ahead, as shown in FIG. 8. Note that an illuminance a predetermined distance ahead and a luminous intensity indicative of an intensity of a light source are correlated and a bicycle head lamp's distribution of light is often defined by luminous intensity, as follows:

(a) A luminous intensity of no less than 400 cd for a position A corresponding to an axis of a head lamp 10 m ahead.

(b) A luminous intensity of no less than a half of a maximum luminous intensity Imax for a rectangular range from a point A to four degrees horizontally and one degree vertically as seen from the head lamp.

(c) A luminous intensity of no more than 120 cd for an upper zone C exceeding 3.5° from a center.

This standard for luminous intensity distribution is determined so that at nighttime an object 10 m ahead can be identified and pedestrians, cyclists, and the like in front of the head lamp do not feel dazzled by the lamp. The reduced luminous intensity for zone C is provided to prevent a vehicle running in an opposite direction from being dazzled.

Such a distribution of light as described above, a luminous intensity of a center of a front side corresponding to an axis of a head lamp in particular, cannot be implemented with a typical LED.

FIG. 9 represents luminance of each portion measured at a distance of 1 m. A maximum luminous intensity of 24.8 cd is provided and at a main region corresponding to a center of the head lamp no less than 20 cd is implemented. It is impossible, however, to satisfy no less than 400 cd, as provided in the above standard, at center portion A.

FIG. 10 is a cross section of a bicycle head lamp using three LEDs. In the figure, three LEDs 101, 102, 103 are each a narrow-angle emission LED emitting ahead light of 15° in full width at half maximum (FWHM). In the light of 15° in FWHM, light of a value corresponding to a half of a peak value at a center of light emitted ahead has a maximum spreading width of 15° from a direction of a center thereof. Typical LEDs emit light spreading with larger width. As such, the narrow-angle emission LED described above can be regarded as an LED having excellent directivity.

Furthermore the FIG. 10 head lamp is provided with concave (parabolic) reflectors 141, 142, 143 surrounding LEDs, respectively, from behind. A significant portion of light emitted from an LED travels directly from the LED ahead. Light emitted spreading wider in angle is emitted ahead by concave reflectors 141, 142, 143 surrounding the LEDs from behind. This allows light to be economically collected ahead.

However, light other than that having a path changed by the concave reflector, i.e., light emitted from the LED ahead does not have its path changed and travels ahead. The light that does not have its path changed and is emitted ahead spreads with a small angle when it is output from the LED. When it is output from a bicycle head lamp illuminating 10 m ahead, however, it spreads significantly.

FIG. 11 represents a distribution of illuminance of a bicycle head lamp measured at 5 m ahead and converted into luminous intensity. Despite as many as three LEDs are used, maximum luminous intensity Imax at a center is still no less than 97.5 cd and in a center region is no less than 80 cd. This is far from the luminous intensity of 400 cd at center point A provided in the aforementioned standard.

An LED provides high energy efficiency, has a long lifetime and is also effective in miniaturization. Accordingly there is a demand for development of a bicycle head lamp employing an LED to satisfy the above standard and other similar, various distributions of luminous intensity.

SUMMARY OF THE INVENTION

The present invention contemplates a bicycle head lamp employing an LED providing high energy efficiency, capable of readily providing sufficient illuminance at a center of an illuminated plane a predetermined distance ahead and also implementing a predetermined distribution of light.

The present head lamp is attached to bicycles. It includes: a casing holding a light source and provided with an opening allowing light from the light source to be emitted ahead; a plurality of light emitting diodes adjacently arranged as the light source; and a condenser lens arranged adjacent to the opening for each the light emitting diode to condense light received from the light emitting diode.

Thus light output from a plurality of LEDs can be collected ahead at a predetermined position to provide an increased distribution of light at the position, an increased illuminance in a vicinity of an optical axis of the head lamp in particular. If the LED simply has a rear side surrounded by a reflector, only an LED providing a narrow distribution of emission can be used as the LED surrounded by the reflector. When a lens is also introduced, not only the narrow-angle emission LED but a wide-angle emission LED can also be used. In terms of miniaturization the wide-angle emission LED is more desirable since a condenser lens can entirely be utilized to condense light. The use of the wide-angle emission LED can alleviate precision of a direction of LED.

The adjacently arranged LEDs may be arranged in a single row or multiple rows or collected together in close contact randomly.

The lens is only required to be a condenser lens and it may a convex lens, a Fresnel lens or the like.

The head lamp can have more than two light emitting diodes each arranged adjacent to at least two other light emitting diodes.

Each LED is arranged adjacent to at least two other LEDs such that (d1) no less than 3 LEDs are arranged annularly or (d2) in multiple rows, as predetermined. For example, the number of LEDs of a last row, a first row or the like is not different from that of LEDs of an adjacent row by no less than two and the LEDs are not biased in arrangement. A plurality of LEDs that are arranged in close contact, as described above, allow the head lamp to be reduced in size and provide an improved distribution of light a predetermined distance ahead, an increased illuminance in a vicinity of an optical axis of the head lamp in particular.

In the head lamp a light emitting diode arranged at an end of an arrangement of the plurality of light emitting diodes can provide an optical axis inclined to approach (a1) or be farther away (a2) from a front of a center of the head lamp as the optical axis extends farther ahead, so that a distribution of light is satisfied a predetermined distance ahead.

Thus a distribution of illuminance, i.e., a distribution of luminous intensity or a distribution of light a predetermined distance ahead in a vicinity of the head lamp's optical axis at a predetermined region can be readily adjusted while at a center a predetermined luminous intensity can also be satisfied. This can help to satisfy a variety of standards for a distribution of illuminance the predetermined distance ahead at the predetermined region that are determined with safety considered. For item (a1), a luminous flux output from an LED located at an end is allowed to intersect at an appropriate position before a predetermined distance ahead, as determined in a standard, to appropriately spread the predetermined distance ahead to provide an adjusted distribution of light. For a predetermined case, an end's optical axis can be inclined outward, as described in item (a2).

In the present bicycle head lamp a plurality of LEDs can be arranged in multiple rows.

The plurality of LEDs arranged in multiple rows can help to provide increased illuminance at a position corresponding to a center of the head lamp and also reduce the head lamp in size.

In the present bicycle head lamp five LEDs can be arranged, in two rows.

For example, a row of two LEDs and that of three LEDs can be stacked to readily ensure a predetermined illuminance ahead at a position corresponding to a center.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Reference will now be made to the drawings to describe the present invention in an embodiment.

Figure 1:
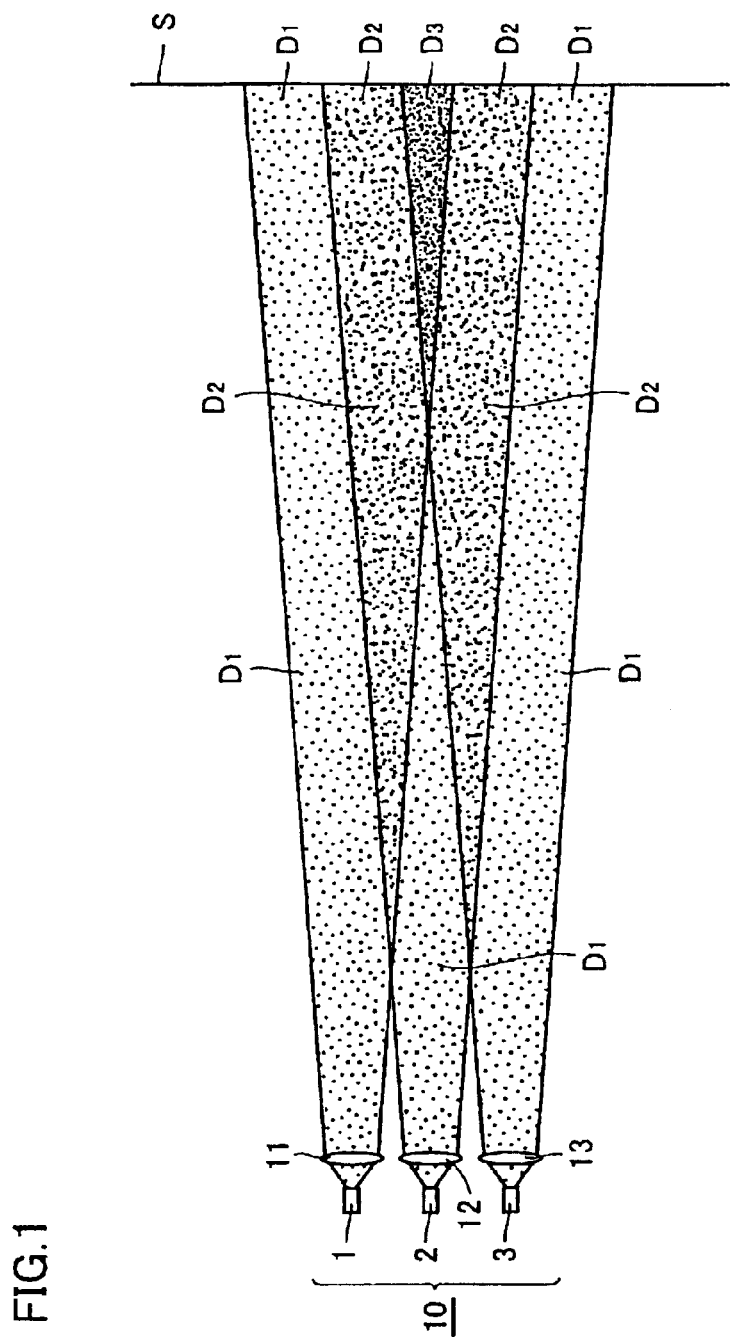
FIG. 1 is a diagram for illustrating a principle of the present invention.

With reference to FIG. 1, as a light source three LEDs 1–3 are adjacently arranged and in front thereof condenser lenses 11–13 are arranged, respectively. The LED is of a type providing a wide-angle emission for example of 50° in FWHM. The condenser lens can be a convex lens, a Fresnel lens formed of a convex lens having a thickness removed in steps concentrically to provide a continuum, or the like. The wide-angle emission LED emits light which in turn illuminates the condenser lens and is emitted so that it is condensed to a predetermined extent. Since the condenser lens is arranged for each LED, condenser lenses 11–13 emit a luminous flux substantially parallel beams of light. Typically, a distribution of light for example on an illuminated plane S 10 m ahead is considered. Accordingly, a predetermined spreading is introduced so that the luminous fluxes output from the three LEDs partially overlap on illuminated plane S.

In FIG. 1, D1 represents a region formed of a single luminous flux, D2 represents that in which two luminous fluxes overlap, and D3 represents that in which three luminous fluxes overlap. Light emitted from LED does not have coherence and overlapping luminous fluxes do not provide interference. As such, overlapping light does not provide interference fringe and provides brightness similar to that of a typical incandescent light. As such in FIG. 1 on illuminated plane S region D3 is the brightest.

The number of LEDs, spreading of a luminous flux having been output from a condenser lens, and the like can be set in accordance for example with the size and illuminance of region D3 required 10 m ahead. If three narrow-angle emission LEDs and concave reflectors surrounding the LEDs from behind are used to form a head lamp, the LED emits ahead light of approximately 15° in FWHM, which is too wide and region D3 accordingly spreads too wide and effectively increased front illuminance cannot be provided. Furthermore, setting the LED's emission angle to be narrower to provide increased front illuminance 10 m ahead entails high precision exceeding that for fabricating LEDs of significantly small sizes, which is substantially impossible.

In accordance with the present invention a plurality of LEDs can adjacently be arranged and each provided with a condenser lens to allow light output from each LED to spread within a predetermined angular range in accordance with a distance of an illuminated plane ahead, a required front illuminance, and the like. This can facilitate control to allow a distribution of light on an illuminated plane ahead to satisfy required performance.

Figure 2:
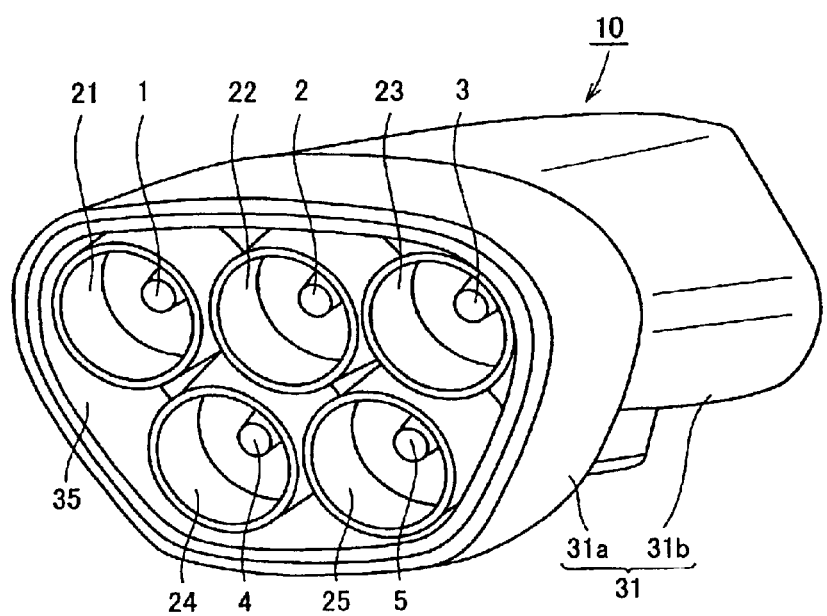
FIG. 2 is a perspective view of a bicycle head lamp of the present invention in an embodiment.

With reference to FIG. 2 in the present embodiment five LEDs 1–5 are arranged in two rows. The upper row includes three LEDs 1–3 and the lower row includes two LEDs 4 and 5. In front of the LEDs depiction of condenser lens is omitted for simplicity but in reality a condenser lens is arranged for each LED. The LEDs are held by cylindrical holders 21–25, respectively. In the present embodiment, a condenser lens is fixed at an upper end of each cylindrical holder. Furthermore in front thereof a transparent plate 35 is arranged, supported by a light source accommodating portion 31a in the form of a casing, for protection against collision with objects when the bicycle is running. Casing 31 includes light source accommodating portion 31a accommodating a light emitting portion and a battery accommodating portion 31b accommodating a battery (not shown). It is not a requirement that the battery and light source accommodating portions be identified separately and a continuous, cylindrical casing may be used. Furthermore, a press-button switch (not shown) is arranged at a rear end of the battery accommodating portion.

The condenser lens may be a glass lens, a plastic lens or any other similar lens. Furthermore the cylindrical holder may be formed of any type of plastic. Transparent plate 35 may be a transparent plastic plate and casing 31 may be formed of any type of plastic colored with design taken into consideration.

Figure 3:
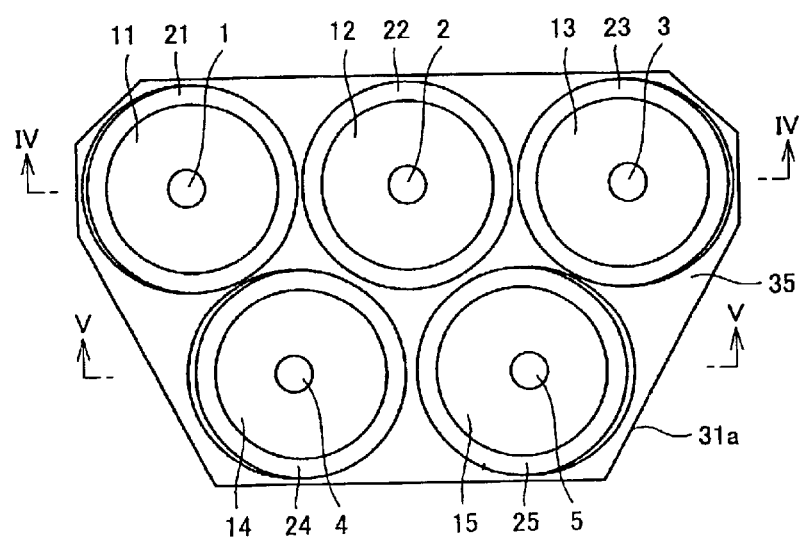
FIG. 3 is a front view of the FIG. 2 bicycle head lamp.

FIG. 3 is a front view of the FIG. 2 bicycle head lamp. LEDs 1–5 are arranged most rearward and surrounded by cylindrical holders 21–25. The cylindrical holders have their respective upper ends with condenser lenses 11–15 attached thereto. In front thereof transparent plate 35 for protection has a circumference fixed to light source accommodating portion 31a. Light source accommodating portion 31a does not particularly have an internal surface provided for example with a reflector.

Figure 4:
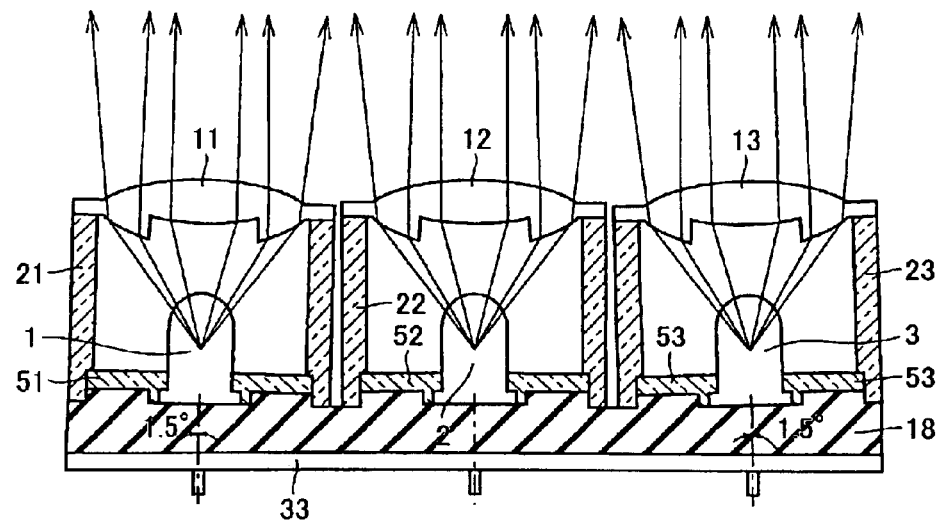
FIG. 4 is a cross section of FIG. 3 taken along a line IV—IV.

FIG. 4 is a cross section of FIG. 3 taken along a line IV—IV. Condenser lenses 11–13 are a Fresnel lens. LEDs 1–3 are electrically connected to a common circuit board 33. On circuit board 33 a spacer 18 is arranged to allow electrical connection thereof. Furthermore the LEDs are fixed by LED holders 51–53, respectively. LED holders 51–53 also engage with cylindrical holders 21–23 individually.

In FIG. 4 it should be noted that LEDs 1 and 3 positioned at opposite ends provide an optical axis inclined inward by 1.5°. This can help to adjust a distribution of illuminance, i.e., a distribution of luminous intensity or a distribution of light a predetermined distance ahead in a vicinity of the head lamp's optical axis at a predetermined region while satisfying a predetermined luminous intensity at a center. Inclining inward an optical axis of an LED arranged at an end allows a luminous flux therefrom to intersect at an appropriate position in front of a predetermined distance ahead, as determined by a standard, to appropriately spread the predetermined distance ahead to provide an adjusted distribution of light. To satisfy a predetermined distribution of light an end's optical axis can also be inclined in a direction opposite to that inclined as described in the present embodiment, i.e., outward.

As described above, each LED and cylindrical holder can have an inclination set and fixed by spacer 180 and LED holders 51–53 with high precision. The LED holder is fixed by a plurality of bosses (not shown) to spacer 18 with a predetermined inclination. Each LED may be provided at a foot thereof with a cushion in the form of an O ring to facilitate setting and holding the above holding.

Figure 5:
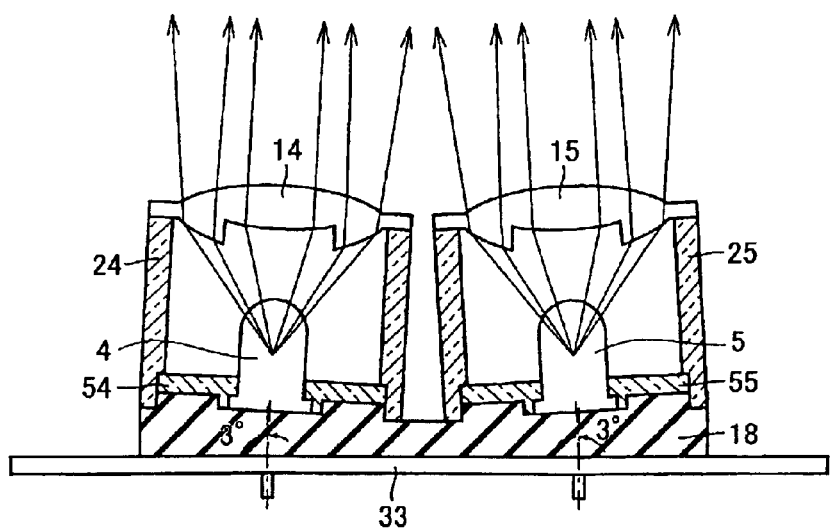
FIG. 5 is a cross section of FIG. 3 taken along a line V—V.

FIG. 5 is a cross section of FIG. 3 taken along a line V—V. Similarly as shown in FIG. 4, each LED is fixed with a predetermined inclination by spacer 18 and LED holders 54, 55 overlying circuit board 33. LEDs 4, 5 arranged at opposite ends provide an optical axis inclined inward by 3°. The LED shown in FIG. 5 has an inclination larger than that of FIG. 4 to allow a luminous flux to intersect at a position adjusted at the upper and lower rows independently more precisely to satisfy a required distribution of light.

Figure 6:
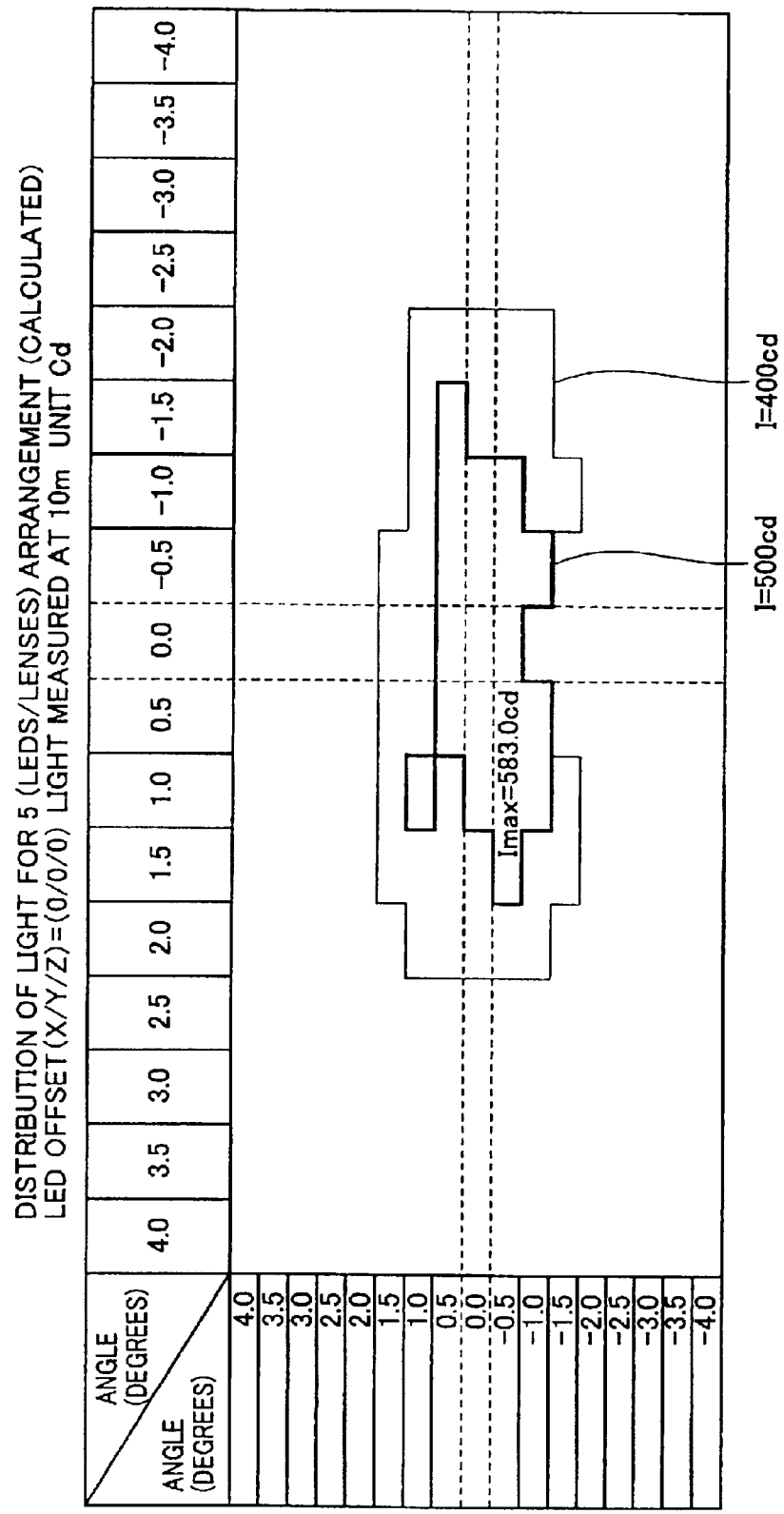
FIG. 6 represents a calculated value of a distribution of light of the bicycle head lamp of the present invention in an embodiment.
Figure 7:
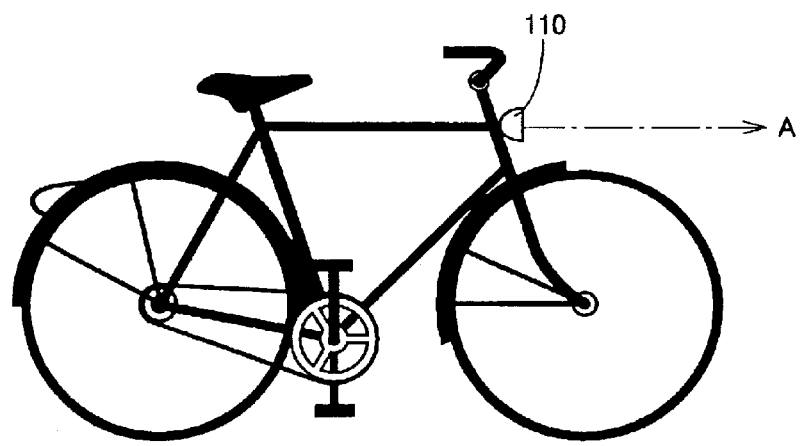
FIG. 7 shows a typical bicycle.
Figure 8:
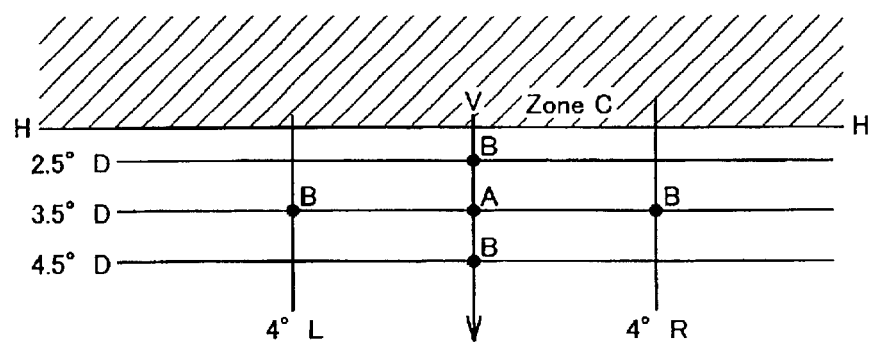
FIG. 8 represents an exemplary luminous intensity standard.
Figure 9:
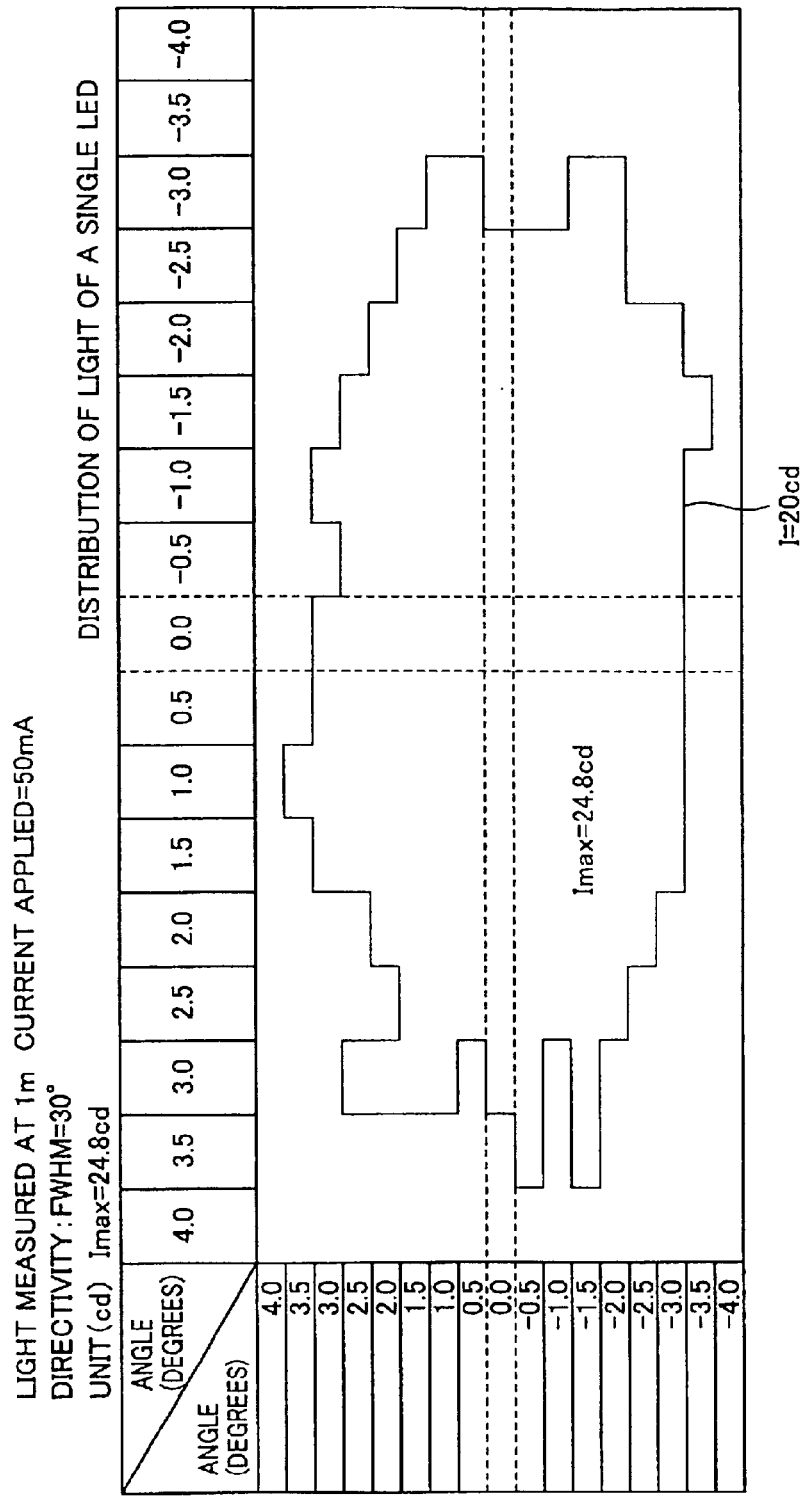
FIG. 9 represents a distribution of light of a single LED.
Figure 10:
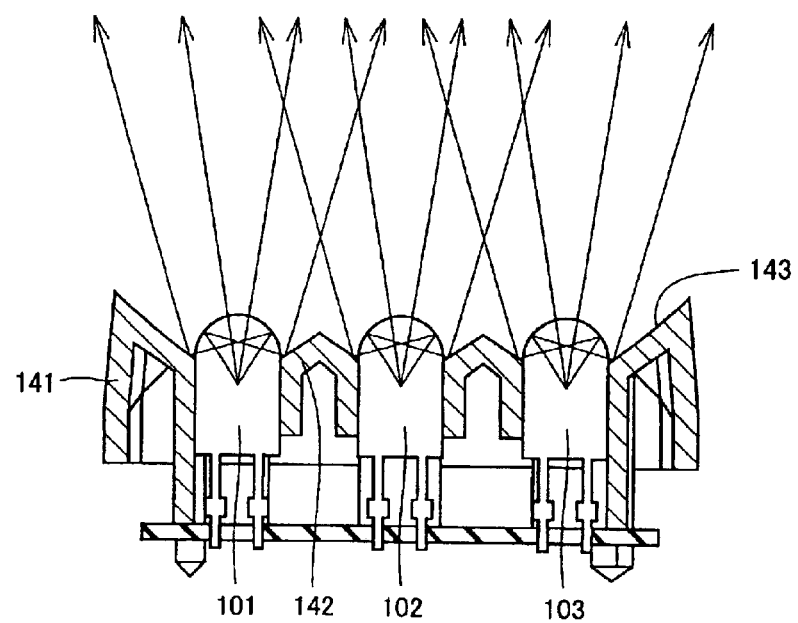
FIG. 10 shows a conventional bicycle head lamp including three LEDs and a concave reflector provided for each LED.
Figure 11:
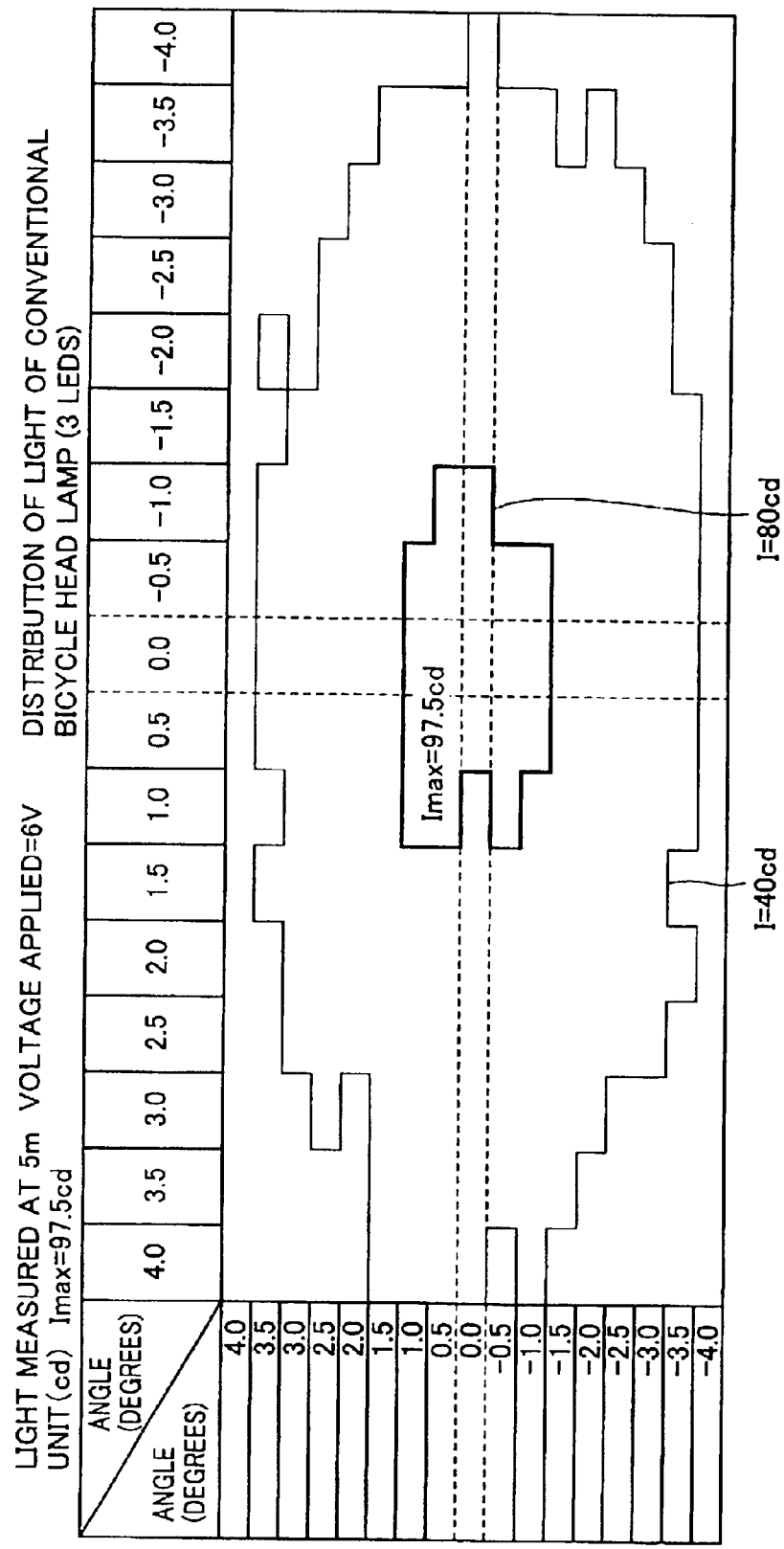
FIG. 11 represents a distribution of light of the FIG. 10 bicycle head lamp.

FIG. 6 represents a calculated value of a distribution of light obtained when the FIG. 2 head lamp is used to illuminate a plane 10 m ahead. A calculated value of a distribution of light of this type is known to represent a result of measurement with precision. Maximum luminous intensity Imax of 583.0 cd is provided. Not only the standard of 400 cd in a vicinity of center position A but no less than 500 cd is also sufficiently satisfied.

As described in the above embodiment the present invention provides a plurality of LEDs adjacently arranged and a condenser lens for each LED to readily provide increased illuminance a predetermined distance ahead as well as satisfy a predetermined distribution of light.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A head lamp attached to a bicycle, comprising:
   a casing holding a light source and provided with an opening allowing light from said light source to be emitted ahead;
   a circuit board installed in said casing;
   a plurality of light emitting diodes (LED's) adjacently arranged and electrically connected to said circuit board and extending ahead of said circuit board, as said light source;
   an LED holder fixing each said LED;
   a cylindrical holder surrounding each said LED, engaging with said LED holder and extending ahead of each said LED;
   a spacer sandwiched between said LED's, said LED holders and said cylindrical holder that are located ahead of the spacer, and said circuit board that is located behind the spacer; and
   a condenser lens arranged for closing said cylindrical holder for each said LED to condense light received from said said light emitting diode LED, said head lamp has more than two said LED's, each arranged adjacent to at least two other LED's; and said LED holder fixed on said spacer is inclined so that a LED arranged at an end of an arrangement of said plurality of LED's has an optical axis inclined inward or outward from the optical axis of an adjacent LED to provide a distribution of light a predetermined distance ahead in a vicinity of the head lamp's optical axis, while satisfying a predetermined luminous intensity at a center.

2. The head lamp of claim 1, wherein said plurality of LED's are arranged in multiple rows.

3. The head lamp of claim 1, wherein five said LED's are arranged in two rows.

* * * * *